Dec. 30, 1958  W. E. McCADDEN  2,866,390
AUTOMATIC CONTOUR DUPLICATOR
Filed Jan. 3, 1955  4 Sheets-Sheet 1
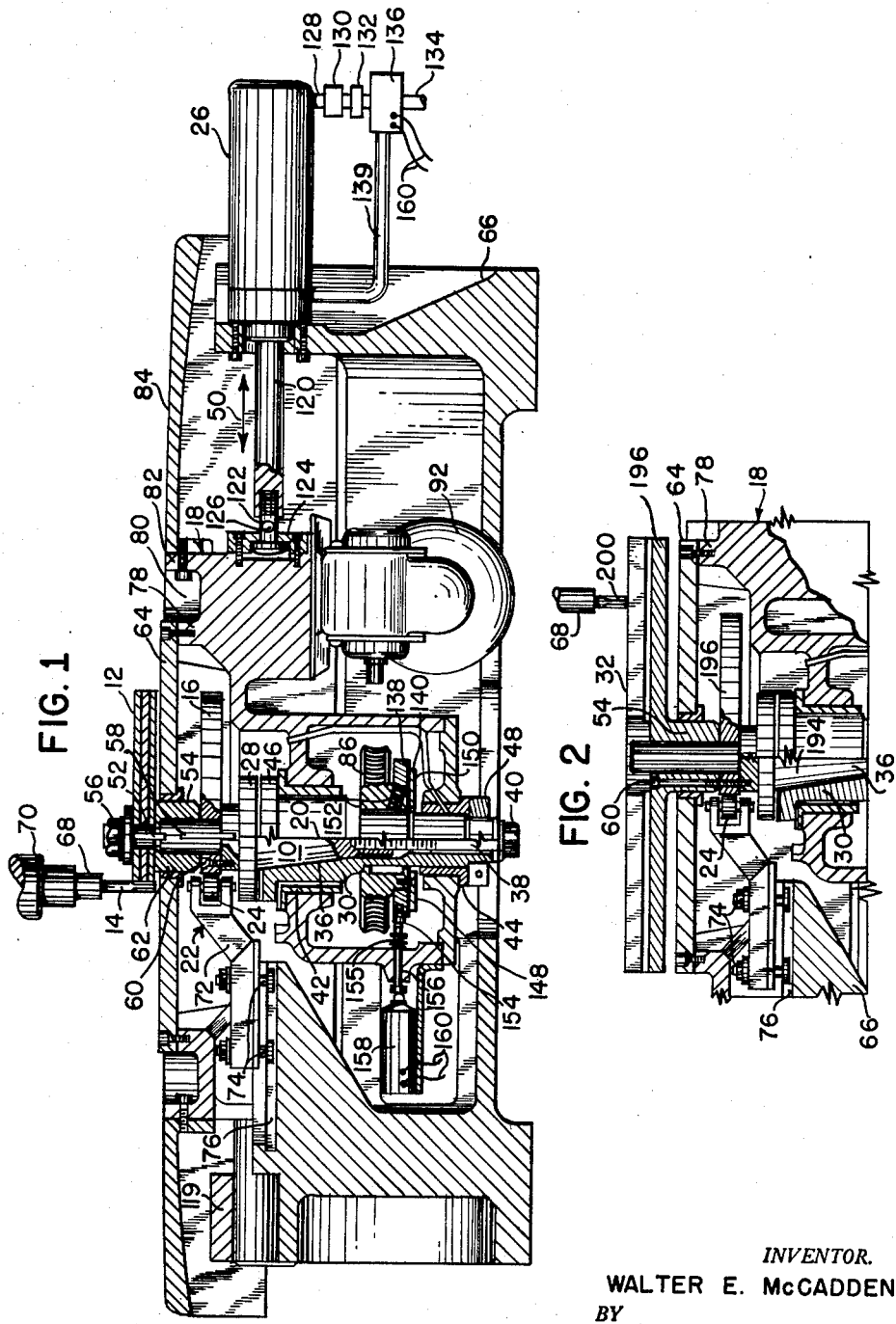
INVENTOR.
WALTER E. McCADDEN
BY
William C. Stueber
ATTORNEY

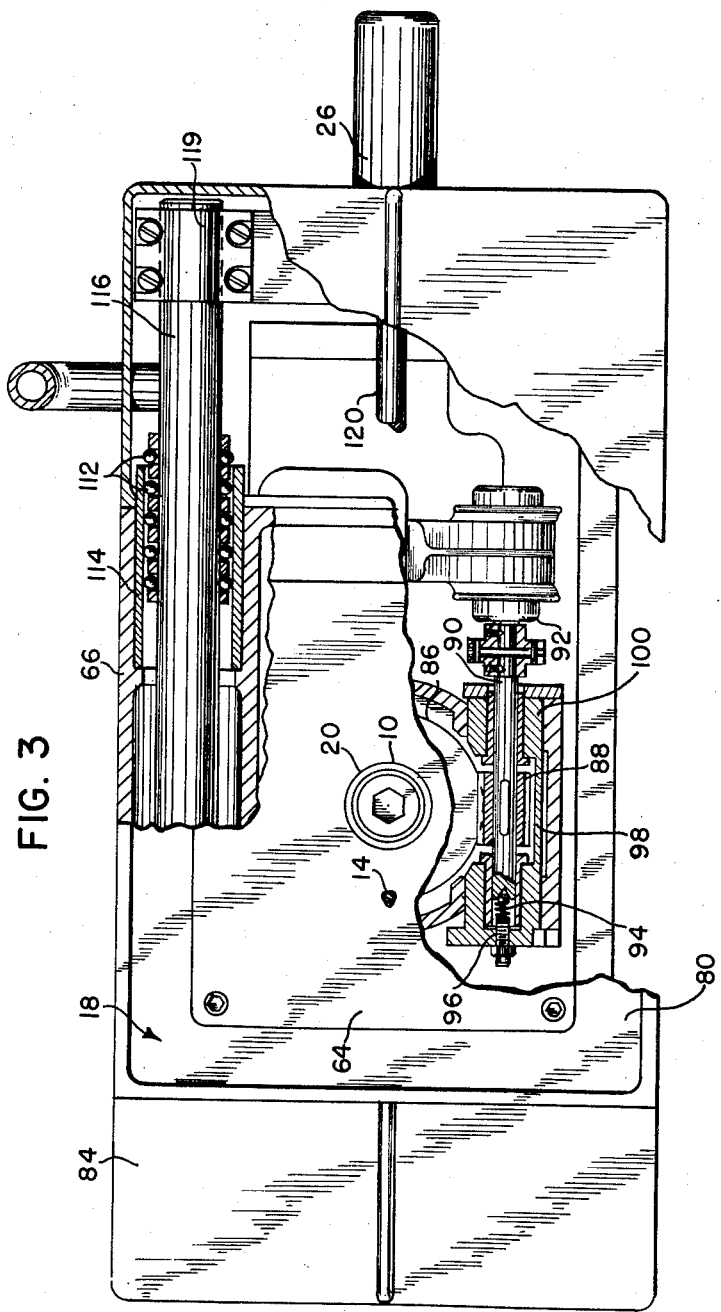

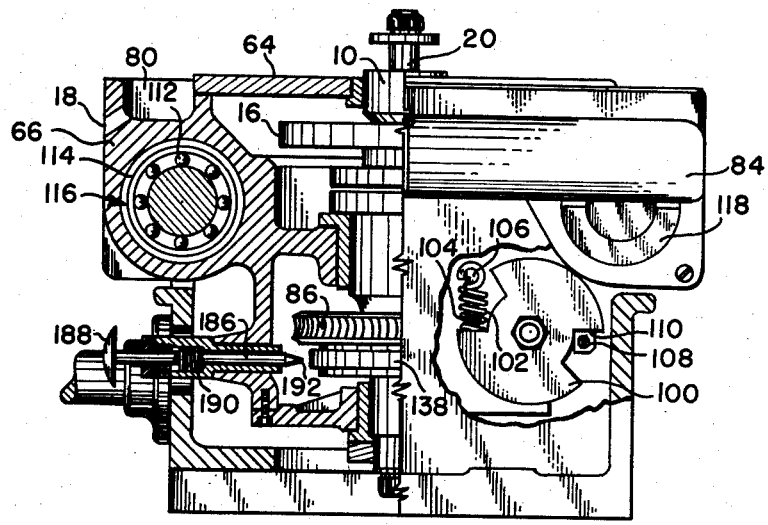
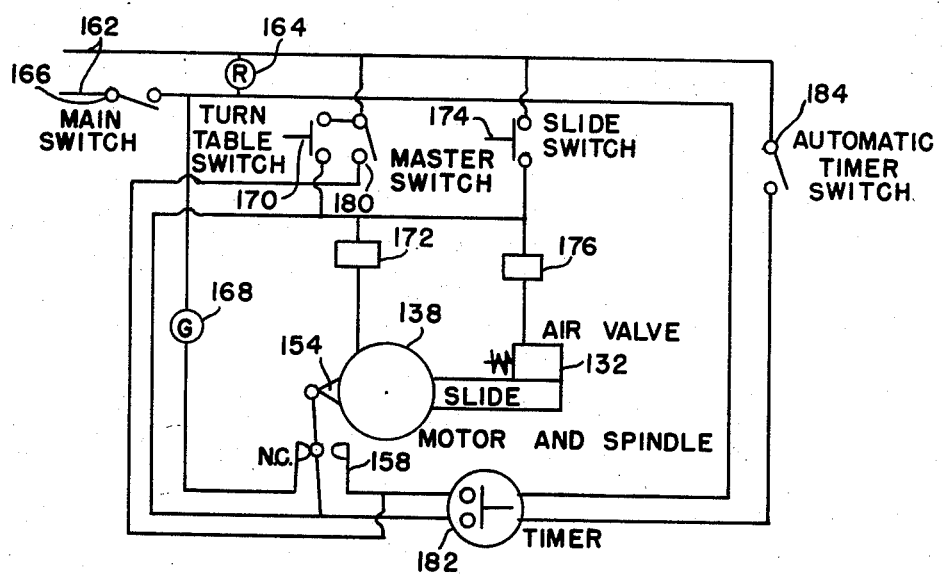

INVENTOR.
WALTER E. McCADDEN
BY William C. Stueber
ATTORNEY

United States Patent Office 2,866,390
Patented Dec. 30, 1958

2,866,390

AUTOMATIC CONTOUR DUPLICATOR

Walter E. McCadden, Minneapolis, Minn., assignor to General Mills, Inc., a corporation of Delaware Application January 3, 1955, Serial No. 479,384

9 Claims. (Cl. 90—13.4)

The present invention relates to improvements in pattern controlled milling machines for cutting cams.

In cutting cams for machinery the cost is usually in proportion to the tolerance required. This is because of the increasing cost of making the master cam with increased precision requirements and because of the additional time which must be spent in the additional number of operations and the care which must be taken in cutting the production cam from the master.

The cost of the production cams can be reduced in a number of ways. One factor which will reduce the cost is the provision of a machine in which the error between the master and workpiece is extremely small so that the tolerance of the master cam may be greater, thus reducing the cost of the master.

Another way of reducing the cost of production cams is to provide a machine in which the operator can be certain that it will consistently cut the production cam to the same tolerance over the master, thus reducing the inspection time required and eliminating costly defects and completely eliminating the possibility of having rejects.

The cost of producing cams will also be decreased if the machine is made completely automatic, thereby reducing the human error and also permitting the operator to operate more than one machine.

It is an object of the present invention to provide a production cam machine which will produce cams with greatly improved accuracy, thereby markedly reducing the cost of the cams.

It is a further object of the invention to provide an automatic cam machine in which the cams produced are extremely uniform and are automatically produced eliminating human error, thereby reducing inspection costs and completely eliminating rejects.

A more specific object of the invention is to provide an improved machine in which the cutting tool will automatically leave the cam after a number of revolutions of the cam and in which the number of revolutions and the exact point of departure of the tool are selectable by the operator.

Another object of the invention is to provide a machine in which the pressure between the cutting tool and the work piece remain constantly uniform and is not subject to the need for manual control and resulting chance for error.

A further object of the invention is to provide an automatic production milling machine having improved accuracy which can be converted, with a minimum of effort and without major alteration of the machine, to cut cams of various types, such as contour cams, face cams, barrel cams, and can be used on general contour work, cutting O ring grooves, etc.

An object is to provide a milling machine in which the pressure on the cutting tool can be easily regulated to determine the depth of cut and in which the pressure will remain uniform for any adjustment.

Other objects and advantages will become more apparent in the following specification taken in connection with the appended drawings, in which Figure 1 is a view with a vertical section having been taken through the center of the work-supporting spindle;

Fig. 2 is a vertical sectional view of a portion of the machine illustrating how the machine of Fig. 1 may be used to mill a face cam or for general contour work;

Fig. 3 is a plan view of the machine with portions broken away to better illustrate the operating parts;

Fig. 4 is a side elevational view with a portion of the machine broken away and another portion of the figure taken in vertical section through the work supporting spindle;

Fig. 5 is a circuit diagram of the electrical circuit associated with the machine.

Figure 6:
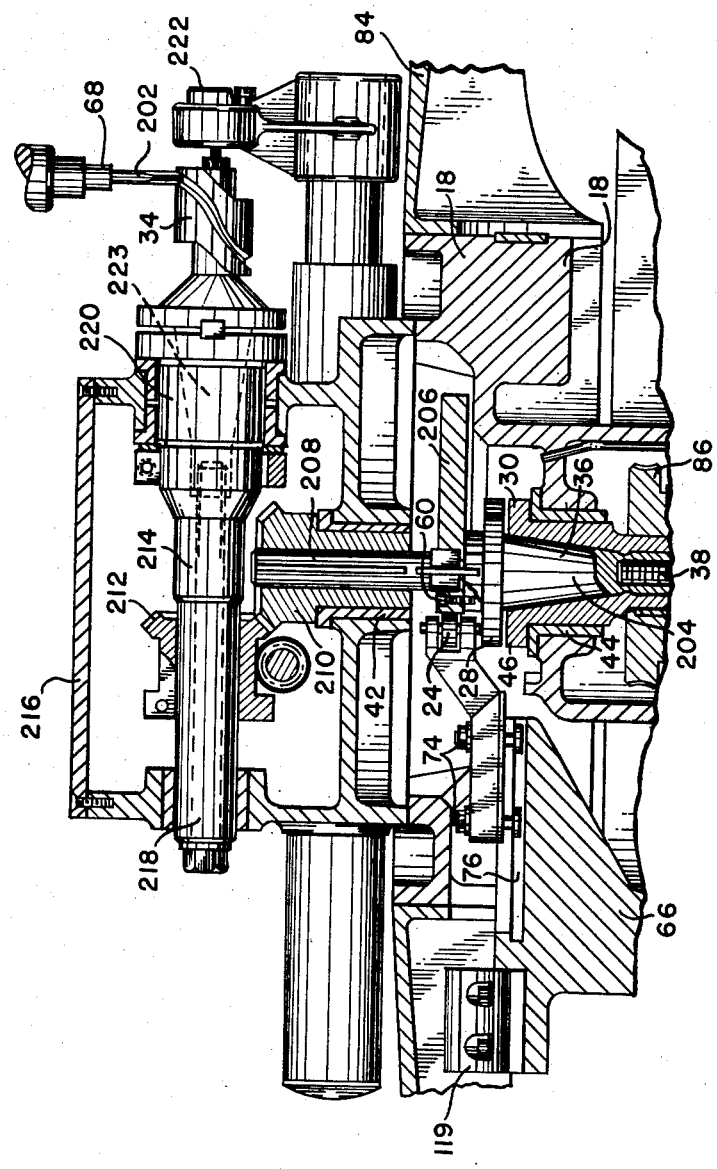
Fig. 6 is a vertical sectional view taken through the center of the machine illustrating how the machine may be adapted to cut barrel cams or cylindrical, or end cams.

The illustrated preferred embodiment of the invention is a production machine used to cut a series of cams in accordance with the contour of a master cam. Many pattern control production machines heretofore used utilize a structure wherein the cutter or the work piece is moved in accordance with the contour of a pattern so that the work piece will be cut to the shape of a pattern. The movement is usually obtained through a linkage which is controlled by a tracer finger moved along the contour of the pattern by the operator. In these cases the movement of the linkage which controls the position of the cutter or the work piece varies in accordance with the pressure between the tracer finger and the pattern and thus the accuracy of the cam which is cut is dependent upon the skill of the operator in maintaining a completely constant pressure between the tracer finger and pattern. This is, of course, fatiguing to the operator and errors will cause an imperfection in the production cam.

In many cases attempts have been made to make the machine automatic to avoid this human element and an effort has been made to insure that the pressure between the tracer finger and the pattern will be constant. Many of these machines, however, still employ a linkage between the pattern and the work piece or between the pattern and the cutter so that any lost motion in the linkage is reflected in inaccuracy of the cam.

Machines which have reduced the amount of linkage between the pattern and the work piece frequently do not provide a completely automatic machine, which still requires operation by a skilled operator, and errors on his part will result in rejects, thus increasing the cost of the individual cams. The present preferred embodiment, although primarily a production machine, is capable of cutting duplicates of a master cam with extreme accuracy and is capable of reproducing each succeeding cam with consistent and uniform accuracy. This is in part achieved by the simplicity of design of the machine. This simplicity, in addition to enhancing the machine's accuracy, accomplishes the paradox which makes it possible to have the machine operated by an operator having a minimum of skill.

The basic principles of the machine are best viewed in connection with Figures 1, 3 and 4 and a brief description of the primary elements of the machine will be first given before proceeding to the details of the illustrated embodiment.

The machine is provided with a vertical work-supporting spindle 10. The spindle is adapted to carry at its upper end a work piece or blank 12 which is positioned when the spindle is in operating position, against a cutting tool 14.

The movement of the work piece 12 with respect to the cuting tool is controlled by the pattern or master cam 16 which is also carried on the spindle and rotates therewith.

To permit the spindle to move the work piece toward or away from the cutting tool in accordance with the contour of the master cam, the spindle assembly is rotatably supported on a movable carriage 18, the carriage having free movement in a direction toward or away from the cutter. This movement is horizontal and parallel to a line drawn through the center of the cutter 14 and the spindle axis 20 and the movement is laterally to the right or left as illustrated in Figs. 1 and 3.

The position of the carriage and hence of the spindle which is supported by it is controlled by a carriage limit member 22 which is fixed. This limit member has a follower roller 24 and as the master cam rotates, it pushes the carriage away from the guide member 20 in accordance with the contour of the cam.

A biasing means is provided to hold the carriage against this guide member and this biasing device is shown in the form of a pneumatic cylinder 26.

The above elements constitute the basic working mechanism of the cam cutter. These elements are augmented by other mechanism which contribute to the above described mechanism making it possible for the above mechanism to cut a more uniform and accurate cam with a minimum of effort and skill on the part of the operator.

The spindle 10 is comprised of a main work arbor portion 28 and of a lower bearing portion 30, the work arbor portion being interchangeable for the cutting of different types of cams.

In Figs. 1, 3 and 4, the spindle illustrated is adapted to cut a contour type cam from the work piece 12.

In Fig. 2 the spindle illustrated is adapted to cut a face cam from the work piece which may be mounted on the face of the holder 32.

In Fig. 6 the adaptation illustrated makes it possible to cut a barrel type cam from the work piece 34.

The work arbor 28 of Fig. 1 is fitted with a lower tapered portion 36 which fits snugly within the lower bearing 30. The work arbor 28 is held within the bearing 30 by a stud 38 threaded up into the arbor and a nut 40 on the lower end of the stud draws the work arbor 28 down into the bearing 30, the arbor and bearing assembly constituting the spindle 10.

The bearing 30 is journalled at its upper end in a supporting bearing 42 which is suitably mounted in the carriage 18. The lower end of the bearing is suitably journalled in a bearing 44 which is also suitably supported in the carriage. The bearing portion 30 of the spindle is held against vertical movement by annular flange 46 at its upper end and by a removable collar 48 at its lower end. With the spindle thus rotatably journalled, it is free to be rotated and will move laterally with the movements of the carriage 18 in the direction indicated by the arrows 50 (see Fig. 1).

The spindle is adapted to carry at its upper end, the work piece 12. Rotation of the work piece with respect to the spindle is prevented by a key 52 and the work piece is held onto the spindle against the top surface of a deflection-preventing bearing 54 by the nut 56.

The spindle is also adapted to carry the master cam 16 which is located below the deflection-preventing bearing 54 and the master cam is prevented from rotating relative to the spindle by a key 58 and by a bolt 60 which extends through the master cam and threads into the body portion 28 of the spindle.

It will be seen that although the lower bearing 30 adequately supports the spindle for rotation, being journalled within the supporting bearings 42 and 44, the pressure between the cutting tool 14 and the work piece 12 exerts a bending moment on the spindle. Small deflections in the spindle would result in inaccuracies in the finished work piece. To help prevent these deflections from occurring, the spindle is also supported at the top end by the deflection-preventing bearing 54 which is positioned between the work piece and the master cam. This bearing is journalled in a support bearing 62 which is supported by a plate 64. The plate 64 bolts to the carriage 18 and also serves as a cover to enclose the master cam and the adjoining working parts.

It is to be understood that the drawings show only the mechanism embodying the features of the present invention and that mechanism for operating the cutter is not described in detail. The invention may be used with various types of milling machines and may even be adapted to be transferred to different machines for attachment.

The mechanism illustrated is used with a milling machine by attaching the frame 66 to the milling machine table beneath the cutting tool. The cutting tool is also part of the milling machine being supported on the milling machine cutting spindle 68 which is supported from the milling machine arbor 70 and is rotationally driven by the milling machine.

The frame 66 is fixed to the milling machine in such a position that the cutting tool 14 and the roller 24 are coaxial. The roller 24 which serves to engage the master cam 16 and act as the guide member for the carriage is rotatably mounted on the bracket 72 which is suitably secured to the frame 66 as by bolts 74. The bolts are mounted in slots 76 on the frame 66 so that the position of the roller may be slightly adjusted to coincide with the center line of the cutting tool 14.

The cover 64 which supports the bearing 62 for the spindle is secured to a flange 78 around which extends a channel 80 for collecting the coolant which may be supplied to the cutting tool. Means such as a drain pipe (not shown) may be provided to remove the coolant from the channel. Connected to the flange 82 which forms the outer wall of the channel is a protecting apron 84 which flares outwardly from the carriage to cover the frame 66 and the enclosed parts. The bearing and shaft ways are protected from fine grit or dirt by neoprene boots, not shown. A driven worm gear 86 is connected to the lower portion of the spindle 10 for driving the spindle in rotation. Worm gear 86 is driven by a worm pinion 88, Fig. 3, mounted on a gear shaft 90 which is driven by the motor 92. The gear mechanism and motor 92 are suspended on the movable carriage to move with the spindle 10.

To help insure accurate cutting of the work piece, rotation thereof must be even and to this end a take-up mechanism is provided for the worm gearing (Figs. 3 and 4). This take-up mechanism comprises a biasing spring 94 which pushes axially on the shaft 90 carrying the worm gear 88. The biasing spring is tightened by bolt 96 turned into the casing 98 which encloses the worm pinion.

To take up the play between the gears the shaft 90 is supported on an eccentric support so that the axis of the pinion 88 may be moved closer toward the gear 86.

The rotational position of the sleeve 98 is controlled by turning a flange 100 which is integral with the sleeve. This flange is urged in a clockwise direction as shown in Fig. 4 by a compression spring 102 which pushes against a shoulder 104 on the flange and against a pin 106 connected to a part of the carriage. This spring continually urges the sleeve to rotate in a direction which will force the driving gears together, thus reducing their play to zero.

To prevent heavy loads from rotating the sleeve too far and causing the gears to slip with respect to each other, a stop pin 108 is provided which is engaged by a shoulder 110 on the flange when the gears are loaded and the flange is rotated in the position shown in Fig. 4. These gears therefore give a positive constant speed drive from the motor 92 to the spindle 10.

The carriage which supports the spindle and moves it toward or away from the cutting tool is supported for free movement in a horizontal direction at right angles to the axis of the spindle. Therefore as the spindle turns, the master cam 16 will engage the follower roller 24 to push the carriage away from the follower roller in accordance with the contour of the master. In order that the movement of the carriage is at all times completely responsive to the shape of the master cam, the pressure between the mechanism and the follower roller must be kept uniform. To obtain this uniformity the carriage is mounted with a frictionless mounting.

This frictionless mounting is supplied by ball bearings 112, Figs. 3 and 4, which are positioned between a bearing sleeve 114 on the frame 66 and a horizontal sliding shaft 116. This ball bearing shaft arrangement is found on each side of the carriage as shown at 116 and 118 of Fig. 4. The shafts are suitably secured to the carriage such as by a cap 119 bolted to the carriage.

It will be seen from the preceding description that the carriage suspended on the balls has complete freedom of lateral movement so that it may quickly and easily respond to the contour of the master cam 16 as it rolls in engagement with the guide or follower roller 24.

Another factor which is essential in obtaining continuously uniform pressure between the follower and master cam is to provide a means to urge the carriage toward the guide roller 24 with a continually equal pressure. This is provided by the pneumatic cylinder 26 which contains a piston (not shown) connected to the end of the rod 120. The rod is suitably connected to the carriage by means of a flange connector 112 which is threaded into the end of the rod and is clamped to the carriage by means of a cap 124 having a hole through its center. The flange connector 122 is provided with an opening 126 so that it may be turned to adjust the position of the carriage with respect to the piston rod.

With the preceding structure, the carriage slides back and forth in response to movement of the piston within the cylinder 26. When air under pressure is admitted through line 128 to the far end of the cylinder, the piston is forced to the left as illustrated in Fig. 1 to move the carriage toward the follower roller 24.

When a new work piece 12 is mounted on the spindle or work arbor, the work piece will of course engage the cutting tool 14 before the master cam can reach the follower roller 24. The cutting tool is in rotation when the carriage is brought over to cutting position and will begin cutting the work piece and will continue to cut until the master cam engages the follower roller and begins forcing the carriage in a direction which will move the work piece away from the cutter. The cutter will then follow around the work piece with the exact contour of the pattern of the master cam. The finished work piece will be a duplicate production cam having exactly the same shape and size as the master cam.

The duplicate will be the same size as the master only when the proportions are 1 to 1. When proportions are not 1 to 1 the master cam will take on an odd shape to enable the operator to cut the desired contour on the work piece. It will be seen that when a smaller or larger master cam than the finished cam is used, the cutter 14 will not be directly above the roller 24 but will be offset. For example, as shown in Fig. 1, if the work piece is to be larger than the master the cutter will be to the left of the roller 24, or if the work piece is to be smaller than the master cam the cutter will be to the right of the roller.

In order that the carriage will not cause the work piece to slam against the cutting tool when it is moved into operating position, a damping valve 130 is provided in the airline to slow the flow of air into the cylinder 26. The piston will thus move slowly to the operating position so that the cutting tool or work piece will not be damaged. This also prevents damage to the follower roller or the master cam when a finished work piece is on the spindle or when no work piece is present on the spindle.

The depth of cut which the cutting tool 14 takes in the work piece is determined by the pressure with which the work piece is pushed against the cutter which is in turn determined by the action of the piston in carrying the carriage to cutter position. This piston pressure can be controlled by a reducing valve 132 which is adjustable to control the pressure of the air admitted into the cylinder 26. Air is supplied from a high pressure line 134 but the pressure of the air in the cylinder will be determined by the setting of the valve 132. This valve can be manually adjusted to selectively control the pressure in the cylinder, and hence the force at which the carriage pushes the work piece against the cutter.

The extreme positions of the carriage are controlled by a solenoid three way spring return valve 136 which admits air pressure to either end of the cylinder 26. If the carriage is to be moved to cutting position, air is admitted by the valve 136 to the line 128. If the carriage is to be moved to non-cutting position, the valve 136 is operated so that air will be admitted to the line 139 to admit air to the other side of the piston and withdraw the piston rod 120.

It will thus be seen that as the spindle is rotated, the carriage will be moved in exact response to the contour of the master cam. Since the relative positions of the master cam and the work piece are positively fixed, being mounted on the same spindle, the cutting tool must cut the work piece to the same size and pattern as the master. There are no linkages between the master and the work piece which could permit lost motion and introduce error.

Further, as the work piece and master rotate, the pressure which urges them toward the cutting tool and toward the follower roller will be uniform. This uniformity is obtained by frictionless mounting of the carriage and by a force of constant pressure on the carriage which is obtained through the means of a pneumatic cylinder which obtains air under controlled pressure. While extreme accuracy is obtained since there is no opportunity for the introduction of error, the machine is extremely well suited to the manufacture of production cams.

An important feature of the machine which improves the quality of the cams cut is found in the device for removing the cam from the cutter. When the work piece has made the desired number of revolutions so that the master cam engages the roller for a complete revolution, the carriage may be moved to the right as shown in Fig. 1 and the work piece, which is now a finished cam, may be easily removed by removal of the nut 56. A new work piece can be placed on the spindle in the same manner, the nut replaced, and the carriage moved to the operating position. This entire operation takes a relatively short time and does not require the attention of a skilled operator. It will be observed that if a work piece is used which originally is round, the cutter will begin by removing an even layer of metal from the surface for the entire revolution until the high portions of the master cam begin to engage the follower roller 24. When these portions engage the follower roller, they will move the carriage so that the work piece moves away from the cutter at these portions. The low portions of the master cam will not engage the follower roller until these portions have been cut away on the work piece and the cutter permits the carriage to move toward the follower roller to the point where the master cam engages the roller.

Even though the cutter is removing no metal, when the cam is finished a slight imperfection will remain on the cam at the spot where the cutting tool and work piece are separated. It is therefore common practice to separate the tool at a non-critical point on the cam. It, of course, requires concentrated attention by the operator to separate the tool at the proper spot. An important feature of the present mechanism is the apparatus which is provided to insure that the cutting tool and the work piece will separate at the predetermined non-critical portion of the cam.

For this purpose an automatic device is provided which trips a switch at the proper point in the rotation of the spindle to operate the solenoid valve 136 to cause the carriage to move from cutting to non-cutting position. This apparatus includes a switch tripping cam 138 (Figs. 4 and 5) which is mounted to rotate with the work supporting spindle. The cam consists of an annular ring which is positioned over a shoulder 140 on the worm gear 86. An annular ring 148 is bolted to this shoulder to hold the cam ring 138 in place. The cam ring is prevented from having rotation relative to the spindle by a frictional member which consists of a ball 150 forced against the inner surface of the cam ring by a spring 152. The cam has a rise 154 which depresses a plunger 156 slidably mounted in an opening in the carriage frame. A spring 155 biases the plunger toward the switch-actuating cam 138. This plunger 156 engages the plunger of a switch 158 which has leads 160 leading to the solenoid valve 136.

It will be seen from Fig. 1 that as the spindle revolves the rise 154 will depress the plunger 156 to actuate the switch 158 thereby causing the solenoid valve 132 to operate. This solenoid valve admits pressurized air through air line 139 to one side of the piston connected to rod 120 and vents the line 128 so that the carriage will be moved to non-cutting position and the work piece will be moved away from the cutting tool.

With the arrangement as thus described, the carriage will be moved to non-operating position at the proper rotational position of the spindle but this will occur each time the spindle completes the revolution. In same instances it is desirable to permit the spindle to make a number of revolutions to be sure that the cutting operation of the work piece is completed. For this purpose a timer switch is introduced into the circuit represented by the leads 160, this timer holding the circuit inactive until the proper time has elapsed which allows the cutting of the work piece to be finished.

The circuit containing the timer and the carriage operating switch is illustrated in the diagrammatic drawing of Fig. 5. Leads 162 supply electricity through the switches and relays for operating the solenoid valve and for also operating the motor 92 which turns the spindle. A suitable pilot light 164 is provided to show that the main switch 166 is closed and another pilot light 168 is provided to flash when the trip switch 158 is closed by the cam rise 154.

A push button switch 170 is provided to temporarily close the relay 172 to the spindle-operating motor to index the motor for trial operations and for setting the position of the adjustable cam 138 in a manner which will be later described. Another push button switch 174 is provided to temporarily close the relay 176 for operating the solenoid valve 132 to move the carriage toward or away from cutting position for trial operation.

For regular operation a master switch 180 is provided to feed electricity to the spindle-operating motor and to the solenoid air valve for the carriage. Closure of this switch will cause electricity to be fed through the trip switch 158 which is normally closed.

The spindle rotates until the rise 154 on the cam 158 on the spindle comes around to open switch 158 which causes the relays 172 and 176 to drop out. This stops the rotation of motor 92 and operates the solenoid valve 132, and returns the carriage to non-cutting position.

For normal operation, however, it would not be desirable to have the cutting operation stop after each revolution. The timer 182 contains a switch which shunts the switch 158. The timer is started and the shunt switch closed by closing the automatic timer switch 184 and as long as the switch in the timer 182 is closed, the trip switch 158 will not affect the operation of the machine. This means that the carriage will continue to hold the work piece into the cutting tool regardless of the cam 138 tripping the switch 158. However, when the time at which the timer is set has expired, the timer switch will open as is illustrated in Fig. 5. When this happens, the circuit to the motor and solenoid must be made through the trip switch 158 and therefore as soon as it is opened, the relays drop out and the machine stops. The timer thus results in the machine operating for the required length of time and the cutting tool and the work piece are separated at the appropriate non-critical spot in the revolution of the cam.

It will be noted that the pilot 168 is lit when the cam opens the double throw trip switch 158. This light may be used for setting the rotational position of the spindle at which the trip switch is operated.

As before described, the cam 138 is held in its rotational position with respect to the spindle by frictional engagement. It is therefore adjustable with respect to the spindle and to adjust it, a holding means is provided which holds the cam stationary while the spindle is being rotated.

With respect to Fig. 4, the device for setting the cam 138 is shown as a spring-loaded plunger 186 having an enlarged head 188 for manual operation. The plunger is urged outwardly to non-operating position by a spring 190 and the plunger and spring are housed in the carriage 18.

To adjust the cam 138 the plunger 186 is pushed inwardly until its pointed end 192 presses against the cam 138. This may be done just as the light 168 indicates that the trip switch 158 is actuated so that the operator will know that at this point the carriage will withdraw the work piece from the cutter. The carriage may be then rotationally indexed while the cam 138 is held, by pressing the push button 170 for short periods. When the portion of the work piece is opposite the point on the cutter at which the cutter should be withdrawn, the plunger 186 may be released to permit the cam 138 to again turn with the spindle. The cam 138 will retain this setting and trip the switch 158 at the proper place to insure that the cutter will always be withdrawn from the cam at the proper non-critical rotational position.

The present machine is readily adaptable to cutting of face cams as well as contour cams. For this purpose, as shown in connection with Fig. 2, the arbor portion 28 of the spindle 10 of Fig. 1 can be removed with the arbor 194 of Fig. 2 replacing it. This arbor 194 also has a tapered lowered end and drops into the bearing 30 to be secured thereto by mechanism similar to stud 38 and nut 40, shown in Fig. 1.

This arbor 194 also requires a master cam 196 which bears against the follower roller 24. The bearing 54 is journalled in a plate 64 and has an upper portion 196 which is adapted to have a work piece secured to it. This work piece is a face cam blank and a new cutter 200 is attached to the cutter spindle 68, this cutter being adapted to cut the proper groove for a face cam. It will be seen that the same principles are employed with the carriage 18 moving in response to the shape of the master cam and the groove cut in the work piece being exactly the shape dictated by the contour of the master. Again, in this operation there are no intervening joints or linkages which can introduce errors and therefore the pattern will be cut to the exact size and shape as the master and an amazingly close tolerance can be maintained.

Another type of cam that may be produced is a cylindrical or barrel cam 34, as illustrated in Fig. 6. In this case the frame 66 must be displaced on the milling machine so that the cutter 202 is offset to be opposite the barrel cam blank.

The removable arbor 28 of the spindle of Fig. 1 is exchanged for a new spindle portion 204 which sets into the bearing 30 and is suitably attached thereto in the same manner as in the spindle of Fig. 1. This spindle also carries a master cam 206 which bears against the follower roller 24 as the spindle rotates.

The upper end of the spindle 208 is adapted to carry a bevel gear 210. This bevel gear meshes with a mating bevel gear 212 which is carried on a second spindle 214 which is horizontal and has an axis extending at right angles to the axis of the first spindle. This second spindle is rotatably mounted in a case 216 which is suitably secured to the top of the carriage 18.

The case is provided with bearings for rigidly supporting the spindle at its rear end 218, at its center 220, and at the end 222 adjoining the barrel cam blank. This spindle also has a center insert or arbor 223 which is drawn into the body of the spindle 214 by a stud and nut 224. It will be observed that as the spindle 204 is rotated, the second spindle 214 is similarly rotated by means of the gears 210 and 212. This rotates the barrel cam blank 34 so that as it revolves, the cutter will traverse a path extending around the cam blank. The relative movement of the cutter parallel to the cam axis is obtained by lateral movement of the blank with respect to the cutter and this in turn is obtained by movement of the entire carriage as dictated by the contour of the master cam 206.

As the spindle is driven and the carriage is urged toward the master cam by the piston and cylinder which are illustrated in Fig. 1, the master cam will be maintained in contact with the follower roller 24. The entire carriage will then move back and forth on its ball bearing supports in accordance with the master cam and thus the shape of the groove cut into the barrel cam will accurately follow the contour of the master 206. Again the same principles which obtain an accurate contour cam or face cam also make it possible to cut an extremely accurate barrel cam. In production use there are no intermediate joints or linkages which permit the introduction of errors and the action of the machine is accurately responsive to the shape of the master cam.

The automatic apparatus for terminating the cutting and separating the cutting tool and cam may be employed in the adaptation shown in Fig. 6. When the cutter has gone completely around the barrel cam, the carriage may be moved so that the cutter moves out of the groove which was cut in the cam. If the cam path is to be continuous and not break out of the end of the cam, the automatic switch may be arranged so that the rotation of the spindle stops but the carriage remains in position so that the cutter will not move out of the groove in the barrel cam.

It will thus be seen that a milling machine has been provided which meets the objectives hereinbefore set forth. The machine is extremely accurate for production operation, thereby reducing the number of operations necessary for producing a cam. The accuracy also in many cases reduces the accuracy necessary for the master cam, thereby reducing the operating cost.

The machine is capable of maintaining an equal pressure between the master cam and the follower roller and therefore errors are not introduced through uneven deflection due to varying stress on the supporting and operating parts. The depth of cut of the work piece can be easily controlled by the control of fluid pressure. Therefore time may be saved by taking large cuts at the beginning and reducing the cut to obtain a finish.

The machine is very simple to operate and can be used by other than experienced personnel. The successive production pieces which are turned off are uniform since each one is operating under essentially the same conditions, thereby reducing costs and eliminating rejects. The machine is easily and readily adaptable to cutting either contour, face, or barrel type cams with a minimum of adjustment and change. These features all serve to obtain a more precise and hence a more inexpensive cam.

I have, in the drawings and specification, presented a detailed disclosure of the preferred embodiments of my invention. It is to be understood that the invention is susceptible of modifications, structural changes and various applications of use within the spirit and scope of the invention and I do not intend to limit the invention to the specific form disclosed but intend to cover all modifications, changes and alternative constructions and methods falling within the scope of the principles taught by my invention.

Now therefore I claim:

1. A machine for cutting cams comprising a first spindle adapted to carry a master contour cam coaxially therewith, means for rotating the spindle, a carriage rotatably supporting the spindle and movable along a path extending substantially at right angles to the spindle, a second spindle also rotatably supported on the carriage and extending at an angle to the first spindle, the second spindle connected to be driven by the first spindle and adapted to carry a work piece adjacent a cutter, a fixed guide positioned opposite the master cam to be engaged thereby to move the carriage in accordance with the contour of the cam, and means biasing the carriage toward the fixed guide to be movable as the cam is rotated on the first spindle.

2. A machine for cutting cams comprising a first spindle adapted to carry a master contour cam coaxially therewith, means for rotating the spindle, a carriage rotatably supporting the spindle and movable along a path extending substantially at right angles to the spindle, a second spindle also rotatably supported on the carriage and extending at an angle to the first spindle, the second spindle connected to be driven by the first spindle and adapted to carry a work piece adjacent a cutter, a fixed guide positioned opposite the master cam to be engaged thereby to move the carriage in accordance with the contour of the cam, and a fluid cylinder and piston operably connected to the carriage to urge it toward the fixed guide in response to fluid pressure within the cylinder to hold the master cam against the fixed guide and cause the carriage to move in accordance with the shape of the master cam as the spindle rotates.

3. A machine for cutting cams comprising a first spindle adapted to carry a master contour cam therewith, said spindle also adapted to carry a cam work piece, a carriage adapted to rotatably support the spindle and suitably mounted for free movement in a path at an angle to the spindle axis, rotational drive means adapted to connect to rotationally drive the first spindle, a second spindle adapted to connect to said rotational drive means in place of said first spindle and also adapted to carry a master contour cam, a fixed guide member positioned to be engaged by the master cam of one of said first and second spindles, a third spindle provided with fittings to rotatably mount the spindle on the carriage at right angles to the second spindle, means to connect said third spindle to be driven by the second spindle, means for mounting a barrel type cam blank on the third spindle to be adjacent a cutting tool, and means for biasing the carriage toward the fixed guide to cause the master cam to bear against the guide to give the carriage movement in accordance with the shape of said master cams.

4. A machine for cutting cams and other contoured parts comprising a spindle adapted to support a master cam for rotation therewith and also adapted to rotate a work piece adjacent a cutting head, a floating carriage freely supported for movement along a path at an angle to the spindle axis, a fixed guide member positioned in the path of the master cam to be engaged thereby as it is moved with the carriage, the carriage moving laterally along its path in accordance with the contour of the master cam as it is rotated with the spindle, means operably connected to the carriage for biasing the carriage toward the guide to hold the master cam thereagainst, rotational driving means supported on the carriage, a driving gear connected to the rotational driving means, a driven gear meshing therewith and coaxially attached to the spindle to rotate the spindle with the driving means, and gear take-up means operably connected to the gears to assure the absence of play between the gears to give a positive drive to the spindle.

5. A machine for cutting cams comprising a spindle adapted to support a master cam for rotation therewith and also adapted to rotate a work piece adjacent a cutting head, a floating carriage freely supported for movement along a path at an angle to the spindle axis, a fixed guide member positioned in the path of the master cam as it is moved with the carriage to be engaged thereby, the carriage moving laterally along its path in accordance with the contour of the master cam as it is rotated with the spindle, means operably connected to the carriage for biasing the carriage toward the guide to hold the master cam thereagainst, rotational driving means supported on the carriage, a driven worm gear coaxially attached to the spindle, a driving worm gear meshing therewith and connected to the rotational driving means, the axis of the driving worm gear being supported by an eccentric mount, and a biasing spring urging said mount toward eccentric rotation to force the worm gears into tight engagement to insure a positive drive with an absence of play between the gears.

6. A machine for cutting cams comprising a work supporting spindle adapted to carry a master contour cam, a fixed guide member positioned to be engaged by the master cam as the spindle rotates, a movably supported carriage rotatably carrying the spindle and moving it toward the guide member, a fluid cylinder and piston operably connected to the carriage to urge it toward the guide member when pressure fluid is admitted to one end of the cylinder and adapted to move the carriage away from the guide when fluid is admitted to the second end of the cylinder, an electrically operated valve for controlling the admission of fluid to the cylinder, a switch operably associated with the valve to cause the valve to admit fluid to the cylinder to move the carriage away from the guide upon actuation, a cam secured to the spindle, the switch and cam relatively located so that the switch will be actuated at a predetermined point in the revolution of the spindle to cause the carriage to be moved away from the guide member and the work piece moved away from the cutting tool at a predetermined position so that the mark left by the tool will occur in a non-critical position on the work piece.

7. A machine for cutting cams comprising a work piece supporting spindle adapted to carry a contour cam for rotation therewith, a carriage rotatably supporting the spindle and mounted for free movement laterally of the spindle, a guide member engaged by the master cam as it is moved by the carriage, means urging the carriage toward the guide member to hold the master cam in contact with the guide and to move the work piece against the cutting tool, means for removing the work piece from the cutting tool being operably attached to the carriage to move it away from the guide, actuating means for operating said carriage moving means, operating means attached to rotate with the spindle to operate said actuating means at a predetermined point in the rotation of the spindle, and means adjustably securing said operating means to the spindle so that the point of operation of the actuating means may be adjusted with respect to the rotational position of the spindle.

8. A machine for cutting cams comprising a spindle adapted to rotate a work piece adjacent a cutting tool and to support a master cam for rotation with the spindle, a floating carriage rotatably carrying the spindle and movable in a linear path at right angles to the spindle axis, a carriage guide member positioned so that the movement of the carriage will bring the master cam into engagement therewith to move the carriage as the master cam rotates with the spindle, means for biasing the carriage toward the guide member, cutting tool removing means attached to the carriage to move it away from the guide member, means for actuating the tool-removing means, cam means secured to the spindle to operate said actuating means at a predetermined point with respect to the revolution of the spindle, means for rendering said actuating means inoperative for a predetermined time so that said cam will have no effect on the actuating means until a certain time has passed but the actuating means will be operated thereafter at said predetermined point with the spindle rotation.

9. A machine for cutting cams comprising a spindle adapted to rotate a work piece adjacent a cutting tool and adapted to support a master cam to rotate with the spindle, means for rotatably supporting the spindle including a carriage supported for movement laterally of the spindle axis, means for rotating the spindle supported on the carriage, a carriage limiting member fixed with respect to the movable carriage and positioned to be engaged by the master cam, means biasing the carriage toward said limiting member to urge the master cam into engagement therewith, the carriage moving back and forth as the spindle rotates to move the work piece toward or away from the cutting tool, carriage moving means adapted to withdraw the carriage to move the master cam away from the limiting member and the work piece away from the cutting tool, an electrical switch adapted to operate said carriage moving means, a cam supported on the spindle and adapted to actuate said switch at a predetermined point in the rotation of the spindle, a timer mechanism operatively associated with the switch and arranged to make said switch inactive for a predetermined time so that the switch will not operate to withdraw the carriage until after said predetermined time but will then withdraw the carriage at the preselected point with respect to the rotation of the spindle.

References Cited in the file of this patent

UNITED STATES PATENTS

| 2,043,810 | Prickett | June 9, 1936 |
| 2,361,565 | Reed | Oct. 31, 1944 |
| 2,371,321 | Stacey | Mar. 13, 1945 |
| 2,386,973 | Mieth | Oct. 16, 1945 |

FOREIGN PATENTS

| 197,669 | Great Britain | Jan. 10, 1924 |
| 684,838 | Germany | Dec. 6, 1939 |
| 726,930 | Germany | Oct. 22, 1942 |